# United States Patent

Bouyssou et al.

(10) Patent No.: US 10,326,188 B2
(45) Date of Patent: Jun. 18, 2019

(54) PROTECTION OF A BATTERY AGAINST AN EXTENDED CHARGELESS PERIOD

(71) Applicant: STMicroelectronics (Tours) SAS, Tours (FR)

(72) Inventors: Emilien Bouyssou, Luynes (FR); Delphine Guy-Bouyssou, Luynes (FR); Frederic Cantin, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 150 days.

(21) Appl. No.: 14/724,168

(22) Filed: May 28, 2015

(65) Prior Publication Data

US 2015/0364802 A1 Dec. 17, 2015

(30) Foreign Application Priority Data

Jun. 17, 2014 (FR) .................................... 14 55528

(51) Int. Cl.
| | |
|---|---|
| *H01M 16/00* | (2006.01) |
| *H01M 10/42* | (2006.01) |
| *H02J 7/00* | (2006.01) |
| *H01M 4/52* | (2010.01) |
| *H01M 10/05* | (2010.01) |
| *H01M 10/0525* | (2010.01) |
| *H01M 4/38* | (2006.01) |

(Continued)

(52) U.S. Cl.
CPC .......... *H01M 16/00* (2013.01); *H01M 4/382* (2013.01); *H01M 4/525* (2013.01); *H01M 10/052* (2013.01); *H01M 10/0525* (2013.01); *H01M 10/0562* (2013.01); *H01M 10/4207* (2013.01); *H02J 7/0031* (2013.01); *H02J 7/0054* (2013.01); *H01M 2200/00* (2013.01); *H02J 2007/004* (2013.01)

(58) Field of Classification Search
None
See application file for complete search history.

(56) References Cited

U.S. PATENT DOCUMENTS

| 5,223,351 A | 6/1993 | Wruck |
| 7,570,012 B2 * | 8/2009 | Dasgupta ............ B60L 11/1809 320/104 |

(Continued)

FOREIGN PATENT DOCUMENTS

| EP | 2076929 | * | 3/2012 | ............ H01M 2/20 |
| EP | 2076929 B1 | | 3/2012 | |
| WO | WO-2013090080 A1 | | 6/2013 | |

OTHER PUBLICATIONS

INPI Search Report and Written Opinion for FR 1455528 dated Mar. 2, 2015 (10 pages).

*Primary Examiner* — Jonathan Crepeau
*Assistant Examiner* — Angela J Martin
(74) *Attorney, Agent, or Firm* — Crowe & Dunlevy

(57) ABSTRACT

An assembly of batteries includes a first battery and a second battery electrically connected in parallel. The first battery is configured to deliver a battery capacity in a first power supply voltage range. The second battery is configured to deliver a battery capacity in a second voltage range. An upper limit of the second voltage range is set between upper and lower limits of the first voltage range. In an operating system, if supplied battery power falls below a threshold, the parallel connected first and second batteries are disconnected from the load.

15 Claims, 3 Drawing Sheets

(51) Int. Cl.
    *H01M 4/525*     (2010.01)
    *H01M 10/052*    (2010.01)
    *H01M 10/0562*   (2010.01)

(56) References Cited

U.S. PATENT DOCUMENTS

| | | | |
|---|---|---|---|
| 7,638,898 B2 * | 12/2009 | Peter | H02J 7/0024 |
| | | | 307/48 |
| 2004/0147971 A1 | 7/2004 | Greatbatch et al. | |
| 2013/0177806 A1 * | 7/2013 | Caldwell | H01M 4/624 |
| 2014/0087227 A1 | 3/2014 | Shih et al. | |
| 2014/0300180 A1 * | 10/2014 | Iwashita | B60L 3/04 |
| 2017/0012445 A1 * | 1/2017 | Takemura | H02J 7/00 |

* cited by examiner

PROTECTION OF A BATTERY AGAINST AN EXTENDED CHARGELESS PERIOD

PRIORITY CLAIM

This application claims the priority benefit of French Patent application number 1455528, filed on Jun. 17, 2014, the disclosure of which is hereby incorporated by reference.

TECHNICAL FIELD

The present disclosure generally relates to electronic systems and, more particularly, to systems using rechargeable batteries of all-solid lithium type. The present disclosure more particularly relates to the protection of such a battery in the case where it should not be recharged for a long period.

BACKGROUND

Lithium ion batteries have significantly developed over the last years. Such thin-film batteries, called all-solid (as opposed to liquid electrolyte) batteries, may be manufactured by using technologies originating from the microelectronics industry.

Many electronic systems now use this type of batteries. They are particularly adapted to systems which recharge regularly, but raise an issue in the case where the battery is not recharged for a significant time period. Indeed, a self-discharge phenomenon which, if lasting too long, damages the battery, occurs at the internal structure level of the battery.

Such a phenomenon is particularly present in batteries of lithium ion type having a negative lithium electrode.

SUMMARY

An embodiment aims at overcoming all or part of the disadvantages of electronic systems using a rechargeable battery.

An embodiment aims at providing a solution to protect an all-solid lithium ion battery against destruction due to an extended charge-less period.

An embodiment aims at providing a solution which requires no modification on the side of the load powered by the battery or on the side of the recharge source of this battery.

An embodiment aims at a particularly simple solution, having an automated operation.

Thus, an embodiment provides an assembly of batteries comprising: a first battery delivering its capacity in a first range of power supply voltages; and a second battery, electrically connected in parallel with the first one and delivering its capacity in a second voltage range, the upper limit of the second range being between the upper and lower limits of the first range.

According to an embodiment, the lower limit of the second range is smaller than the lower limit of the first range.

According to an embodiment, the capacity of the second battery is smaller than that of the first battery.

According to an embodiment, the batteries are of all-solid thin-film lithium ion type.

According to an embodiment, the upper limit of the second range is higher than a voltage beyond which the first battery is damaged.

According to an embodiment, the first and second batteries have different electrochemical structures.

According to an embodiment, the materials of the positive electrodes of the two batteries are of $LiCoO_2$ type, the electrode of the first battery being annealed at a temperature greater than the anneal temperature of the electrode of the second battery.

According to an embodiment, the positive electrode of the second battery is made of a material selected from among $LiMn_2O_4$, $MnO_2$, $Li_4Mn_5O_{12}$, $LiV_3O_8$, $V_2O_5$.

An embodiment provides an electronic system comprising: a battery system; and a control circuit, wherein the control circuit disconnects the batteries from a load to be powered when the voltage across the batteries reaches a threshold.

According to an embodiment, the threshold is greater than the lower limit of the first range and smaller than the upper limit of the second range.

According to an embodiment, the system further comprises a battery recharge element.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION OF THE DRAWINGS

Figure 1:
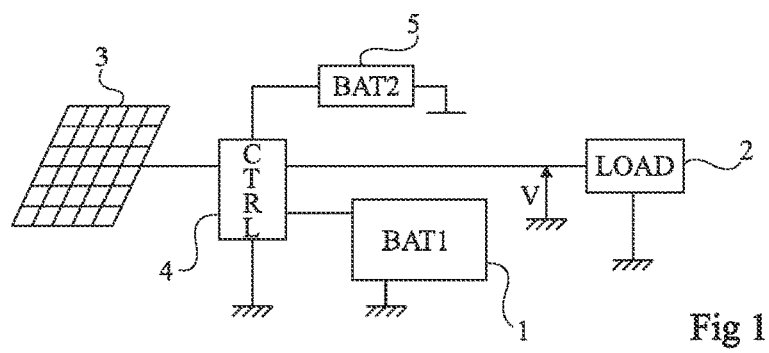
FIG. 1 very schematically shows in the form of blocks an embodiment of an electronic system.

The same elements have been designated with the same reference numerals in the different drawings. For clarity, only those steps and elements which are useful to the understanding of the embodiments to be described have been shown and will be detailed. In particular, the electronic circuits powered by the battery belonging to the system have not been detailed, the described embodiments being compatible with usual loads powered by such batteries. Further, the battery recharge systems have not been detailed either, the described embodiments being here again compatible with usual recharge systems.

In the following description, an all-solid thin-film lithium ion battery will be taken as an example. However, all that will be described hereafter more generally applies to any rechargeable battery for which similar problems are posed.

An all-solid thin-film lithium ion battery is formed of a stack of layers deposited on a substrate by techniques derived from microelectronics. This stack of layers includes, among others, a positive cobalt dioxide and lithium ($LiCoO_2$) electrode, an electrolyte, for example, a LiPON (phosphorus and lithium oxynitride) electrolyte, and a negative metal electrode, for example, made of metal lithium. During battery discharge phases, lithium ions migrate from the negative electrode to the electrolyte and from this electrolyte to the positive electrode. Conversely, during charge phases, lithium ions migrate from the positive electrode to the electrolyte and from this electrolyte to the negative electrode to restore the metal lithium layer.

In such a battery, and more particularly if its negative electrode is made of lithium, a self-discharge phenomenon can be observed, even if the battery is not used, that is, the load connected thereto in order to be powered draws no power. Such a phenomenon may result in a lithium oversaturation of the positive $LiCoO_2$ electrode, which may even destroy it.

Actually, such a battery has a discharge capacity in a given potential range which depends on the nature of the materials used and on their thin film deposition conditions. When the battery discharge reaches a critical threshold, an irreversible phenomenon can be observed, and the battery is then no longer able to be recharged to recover its nominal operating range.

Typically, a battery formed of a $LiCoO_2$—LiPON—Li stack, having its positive electrode annealed at high temperature (for example, greater than 700° C.), has a voltage operating range from approximately 3.5 to approximately 4.2 volts. When the battery discharge reaches a critical threshold such that the voltage thereacross falls below 2.5 volts, the battery starts being irreversibly damaged. When the discharge carries on until the voltage reaches 1.2 volt, the $LiCoO_2$ electrode is totally destroyed.

When the electronic system is regularly recharged, the problem is not posed. However, electronic systems using rechargeable batteries risk being deprived of power for recharging this battery, for a sufficiently long time period to cause such a destructive phenomenon. For example, in the case of a system equipped with a photovoltaic recharge element, the time period during which the photovoltaic screen is masked may be sufficiently long for the irreversible phenomenon to occur. This may for example occur with self-contained sensors when the rooms where they are located are plunged in darkness for too long a period (business holidays of a firm, for example) or with office supplies (electronic calculator, for example) maintained in darkness (for example, in a desk drawer) for too long a time. For systems recharged by a connection to the electric power distribution network (cell phone, for example), such a phenomenon occurs, even for a powered off phone, if the battery is not recharged for too long a period.

Currently, in certain applications, manufacturers advise users, during extended period during which the electronic device is not used, to remove the device battery in order to delay the destruction phenomenon by suppressing the discharge due to leakages in electronic circuits. However, even once the load has been disconnected, the battery keeps on discharging.

FIG. 1 very schematically shows, in the form of blocks, an embodiment of an electronic system fitted with a mechanism of protection of a rechargeable battery 1 (BAT1).

Battery 1 is intended to power a load 2 (LOAD), for example, electronic circuits. Battery 1 is capable of being recharged by various power sources. In the arbitrary example of FIG. 1, a recharge by a photovoltaic sensor 3 is assumed. A control circuit 4 (CTRL) has the function of managing the charge and the discharge of battery 1. Circuit 4 may integrate or not the battery charger. Preferably and as will be seen hereafter in relation with FIGS. 3A and 3B, circuit 4 comprises at least one switch for connecting the battery to load 2.

According to the described embodiments, a secondary or standby battery 5 (BAT2) is provided. Battery 5 has the function of delaying the time when main battery 1 reaches a critical discharge state. Battery 5 also is a rechargeable battery, which however provides a capacity in a voltage range (for example, from 2.6 to 3.6 volts) having an upper limit (for example, 3.6 volts) is smaller than the upper limit (4.2 volts in the above example) of the operating voltage range of battery 1. The operating voltage range of battery 5 is selected so that the lower limit (3.6 volts in the above example) of the operating voltage range of battery 1 is included in this range of battery 2. Preferably, the lower limit (for example, 2.6 volts) of the voltage range of battery 2 is higher than the critical voltage (2.5 volts in the above example) of battery 1 from which an irreversible deterioration starts.

When main battery 1 and secondary battery 5 are electrically placed in parallel, the following phenomenon can be observed. As long as the charge of the main battery is sufficient, nothing occurs at the level of the secondary battery, that is, battery 1 delivers the power to load 2 and everything occurs as if the secondary battery was absent. If the discharge of battery 1 reaches a level such that the voltage across battery 1 becomes lower than the upper limit of battery 5, then the two batteries start operating in parallel and the voltage levels therein balance. In practice, and as will be seen hereafter, it is seen to it that load 2 no longer consumes power except for leakages when battery 5 needs to come into service. As the discharge carries on (leakages in load 2 and in battery 1), battery 5 will deliver the power necessary to delay the time when the charge in the main battery reaches its critical threshold.

The charge capacity of battery 5 is preferably smaller than that of battery 1 since it only operates to "feed" leakages and is not meant to deliver the operating power to the electronic circuits of the system. Thus, its size is smaller than that of battery 1.

Preferably, the electrochemical structure of battery 5 is selected so that the voltage thereacross when it reaches its own critical discharge threshold is the same as that of the critical threshold of battery 1. Thus, main and secondary batteries formed with the same type of materials but having a different electrochemical structure in order to have different operating voltage ranges are preferably provided.

Figure 2:
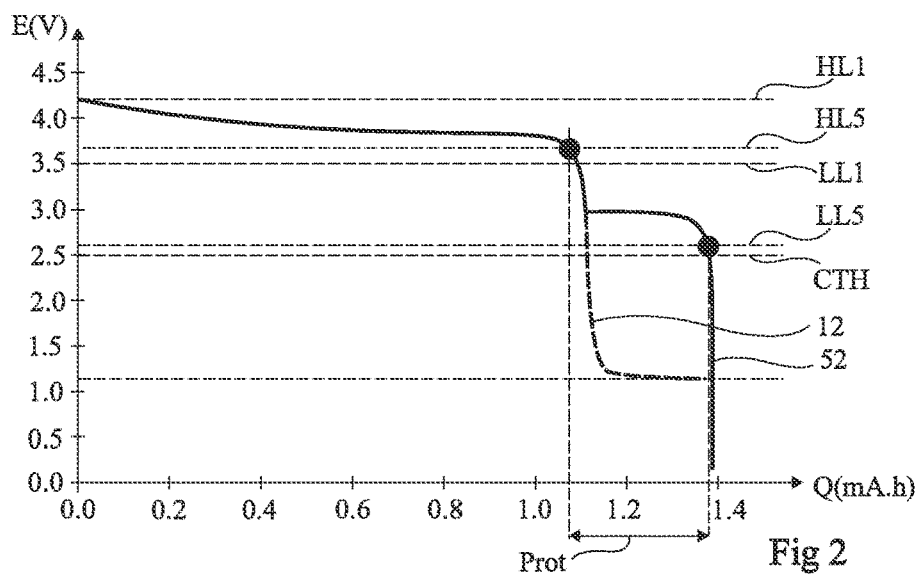
FIG. 2 is a graph illustrating an embodiment of the protection method.

FIG. 2 is a graph showing the variation of the voltage across batteries 1 and 5 according to cumulated discharge Q in milliamperes hours (mA·h). Battery 1 is a battery according to the above example (lithium-ion battery having an operating range between 3.5-volt lower limit LL1 and 4.2-volt upper limit HL1).

In normal operation, with regular charge and discharge periods of the battery, the charge and discharge occur between 3.7 and 4.2 volts.

When the cumulated discharge of battery 1 is such that the voltage thereacross reaches approximately 3.6 volts, a phenomenon of abrupt voltage drop occurs (curve in dotted lines 12).

Without secondary battery 5, this voltage drop carries on until a second voltage stage at 1.2 volts is reached, and then all the way to a total destruction. In the example of FIG. 2, the 3.6- and 1.2-volt thresholds are crossed for a cumulated discharge respectively of 1.05 mA·h and 1.4 mA·h. Such cumulated discharge thresholds however depend on the capacity of the battery (on its surface area). The irreversible deterioration phenomenon generating a decrease of the charge capacity, which occurs below a critical threshold CTH of 2.5 volts, occurs quite rapidly due to the abrupt drop between the functional stage (LL1 to HL1) and 1.2 volts.

Due to battery 5 (curve 52 in full line in FIG. 2), the occurrence of 2.5-volt threshold CTH is delayed until battery 5 is itself sufficiently discharged to reach its own abrupt voltage drop phenomenon. In other words, when the voltage across battery 1 falls below 3.6-volt upper limit HL5 of the operating range of battery 5, the charge balance with battery 5 starts. A battery 5 having a functional stage around 3.2 volts is assumed. Under a constant discharge, battery 5 delivers the power necessary to the leakages in the system and/or in battery 1. Thus, between cumulated discharges in this example of 1.05 and 1.4 mA·h (period Prot), the integrity of the system, and thus of battery 1, is preserved. The capacity of battery 5 adds to that of battery 1, but only in case of too strong a discharge thereof.

To improve the protection efficiency, it will be ascertained that the power consumption of the powered electronic circuits strongly decreases or stops from the time when the charge of main battery 1 is no longer sufficient, so that secondary battery 5 is only used to compensate for leakages.

It could have been devised to add to battery 1 a non-rechargeable cell to deliver spare power thereto. However, this would require, on the one hand, a periodic replacement of this cell to make sure that it has the sufficient power and, on the other hand, a complex control system to decide of the time when such a rechargeable cell should be used.

Figure 3A:
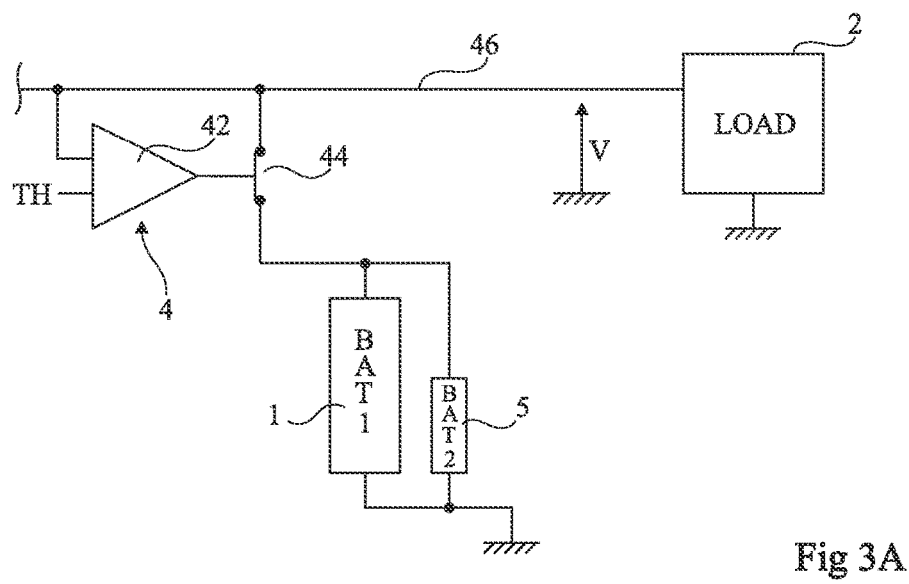
FIGS. 3A and 3B are electric diagrams illustrating an embodiment in two operating phases.
Figure 3B:
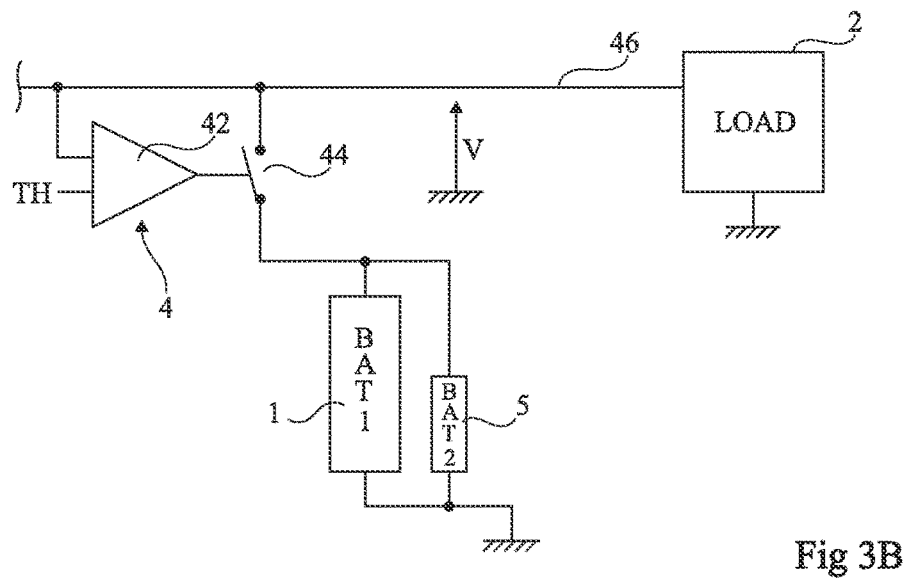

FIGS. 3A and 3B very schematically illustrate in the form of blocks the operation of the system of FIG. 1. In these drawings, control circuit 4 has been partially shown in simplified fashion in the form of a comparator 42 controlling a switch 44 connecting the parallel association of main and secondary batteries 1 and 5 to a power supply conductor 46 connecting the batteries to load 2 to be powered, as well as to the recharge system, not shown. Comparator 42 compares voltage V on a positive power supply line with a threshold TH. In the previously-described example of FIG. 2, this threshold corresponds to high limit HL5 of battery 5, that is, 3.6 volts.

As long as threshold TH has not been reached (FIG. 3A), batteries 1 and 5 are connected in parallel on the installation.

Once threshold TH has been reached (FIG. 3B), comparator 42 causes the turning-off of switch 44 and thus disconnects the parallel association of the batteries from the rest of the installation. From then on, the two batteries 1 and 5 no longer power anything and are in an autonomous operation where battery 5 will compensate for the discharge of battery 1 due to leakages, to delay the destruction thereof.

As soon as the voltage becomes sufficient across the installation (in practice, as soon as a recharge system is connected), switch 44 is turned back on, which enables to recharge both batteries. Indeed, such a recharge power will be used to recharge not only the main battery, but also the secondary battery.

Figure 4A:
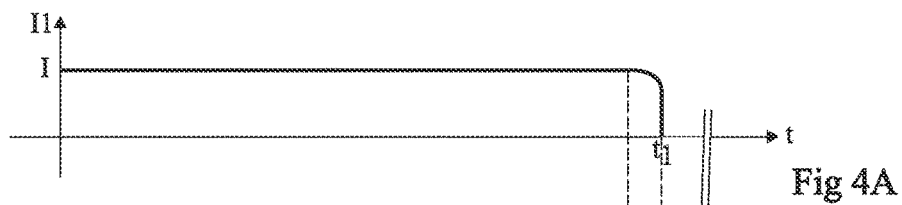
FIGS. 4A, 4B, and 4C are timing diagrams illustrating an embodiment of the protection method.
Figure 4B:
Figure 4C:
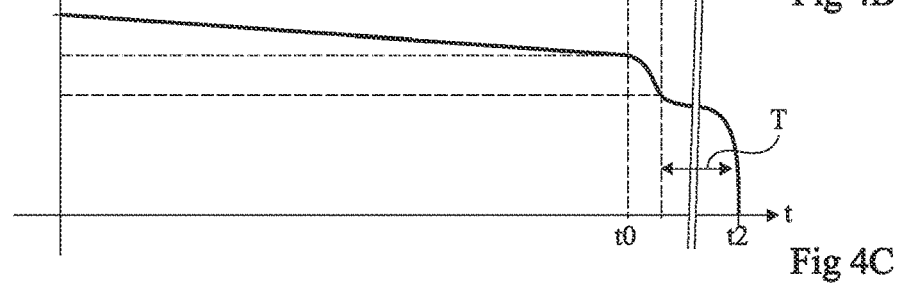

FIGS. 4A to 4C are timing diagrams illustrating the operation of the system of FIG. 1, assuming a discharge at a constant current I and initially-charged batteries 1 and 5. FIGS. 4A and 4B illustrate respective currents I1 and I5 in batteries 1 and 5. FIG. 4C illustrates the shape of voltage V across the parallel association of batteries 1 and 5.

Assuming a continuous discharge under a constant current I, the power is delivered by battery 1 only as long as it has the sufficient charge. At a time $t_0$, battery 1 reaches its charge level such that it starts is abrupt voltage drop phase. Since the discharge occurs under a constant current, its voltage abruptly drops. From a time $t_1$, battery 5 takes over and delivers current I. If a time $t_2$ is reached when the charge of battery 5 is no longer sufficient and it reaches its destruction threshold, the two batteries are then no longer functional.

Assuming a discharge of battery 5 under the same current as battery 1, the ratio of interval $(t_1-t_0)$, between times $t_0$ and $t_1$, to interval T $(t_2-t_1)$, between times $t_1$ and $t_2$, approximately corresponds to the ratio between the charge capacity of the two batteries. However, as seen hereabove, it will be preferably be attempted to decrease the current from time $t_1$, so that period T between times $t_1$ and $t_2$ preserves the functionality of the entire system.

In the example of a lithium-ion battery, the inventors have observed that a plurality of materials are compatible with a main battery 1 having a negative lithium electrode to form the electrolyte of standby battery 5.

According to a first example, the conditions of deposition of the $LiCoO_2$-type electrode are adjusted. For a battery having an operating range between 3.5 and 4.2 volts, this electrode is generally annealed at high temperature (higher than 700° C.). With an electrode of same nature annealed at low temperature (typically in the order of 400° C.), standby battery 5 delivers its capacity within a voltage range from 2.6 to 3.6 volts. This range is compatible with a preservation of the main battery.

According to other embodiments, the following materials provide all or part of their capacities between 2.6 and 3.6 volts: $LiMn_2O_4$ and derivatives thereof (for example, $LiAl_xMn_2-xO_4$), $MnO_2$, $Li_4Mn_5O_{12}$, $LiV_3O_8$, $V_2O_5$.

The selection of the electrode made of the same material as the main battery but having an operating voltage varying according to the deposition conditions is a preferred choice since it simplifies the implementation.

Various solutions may be adopted to form the assembly of batteries 1 and 5.

Figure 5:
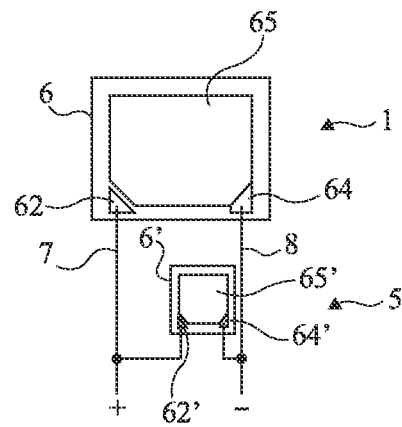
FIG. 5 is a simplified representation of an embodiment of a battery system.

FIG. 5 is a top view of an embodiment of such an assembly. According to this example, batteries 1 and 5 are manufactured separately, and then associated in parallel on packaging thereof. Batteries 1 and 5 are formed on different substrates 6 and 6'. Contact recovery areas 62 and 62' of their positive electrodes (not shown in FIG. 5) are interconnected (connection 7). Contacts 64 and 64' of their negative electrodes 65 and 65' are interconnected (connection 8). The surface area taken up by battery 5 is here smaller than that taken up by battery 1.

Figure 6:
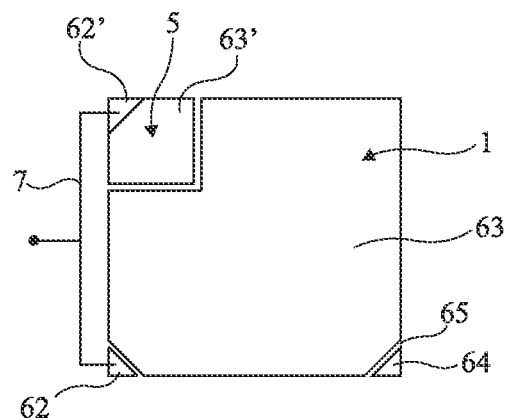
FIG. 6 is a simplified representation of another embodiment of a battery system.

FIG. 6 shows another embodiment according to which battery 5 is formed in a corner of battery 1. To highlight the arrangement of the positive electrodes, FIG. 6 is assumed to be a rear view, that is, from the positive electrodes. Each battery 1, 5 has its own positive electrode 63, 63'. In the shown example, battery 5 takes up a corner of battery 1. Contacting areas 62 and 62' of electrodes 63 and 63' are interconnected (connection 7). Batteries 1 and 5 share the same negative electrode 65, which then takes up the entire surface containing electrodes 63 and 63' and have a common contact 64. The surface area taken up by battery 5 is smaller than that taken up by battery 1. As a specific embodiment, the surface area ratio of main battery 1 to secondary battery 5 is greater than 5, preferably in the range from 10 to 20.

Figures 7A, 7B:
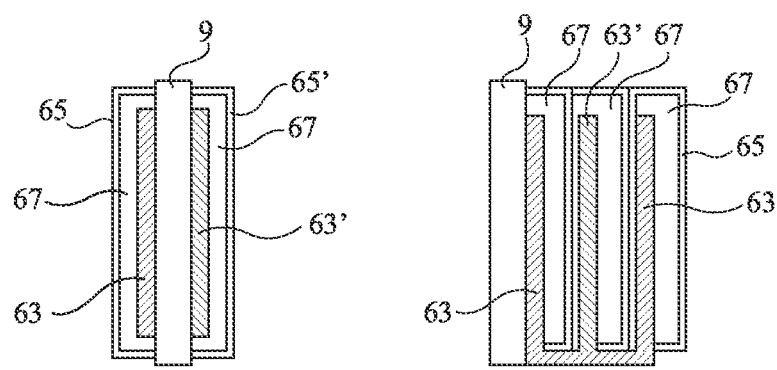
FIGS. 7A and 7B are simplified cross-section views of two other embodiments of a battery system.

FIGS. 7A and 7B show two other embodiments according to which batteries 1 and 5 are formed on a same substrate 9 and have the same surface area. In such a case, for a given surface area, the lifetime is optimized. In FIGS. 7A and 7B, the electrolyte bears reference numeral 67.

In FIG. 7A, batteries 1 and 5 are assumed to be formed on opposite surfaces of substrate 9.

In FIG. 7B, battery 1 is assumed to be multilayer, battery 5 being interposed in the thickness between two layers of battery 1.

An advantage of the described embodiments is that it is now possible to extend the lifetime of a battery of all-solid thin-film lithium ion type in a particularly simple way.

Another advantage is that this solution requires little or no increase of the battery bulk. Indeed, since the secondary battery only delivers its power when the power consumption is very low as compared with the nominal consumption (by a ratio in the order of from 100 to 1,000), it needs not have a large size.

Various embodiments have been described. Various alterations, modifications, and improvements will readily occur to those skilled in the art. In particular, the selection of the material forming the additional battery depends on the application and may vary as compared with the above-described examples. It will be within the abilities of those skilled in the art to adapt the electrode-forming conditions enabling to adjust the voltage ranges of the first and second batteries. Finally, the practical implementation of the described embodiments is within the abilities of those skilled in the art based on the functional indications given hereabove and using battery manufacturing techniques usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. An apparatus, comprising:
a first battery delivering battery voltage to a load in a first voltage range, the first voltage range having an upper limit and a lower limit, wherein operation of the first battery below the lower limit results in damage to the first battery; and
a second battery, directly electrically connected in parallel with the first battery, delivering a battery voltage in a second voltage range; and
a comparator comparing a voltage across the parallel connected first battery and the parallel connected second battery to a threshold, and to open a switch coupling both the parallel connected first battery and the parallel connected second battery to the load if the voltage is less than the threshold;
wherein the second voltage range has an upper limit less than the upper limit of the first voltage range but greater than the lower limit of the first voltage range, such that if the battery voltage of the first battery falls below the upper limit of the second voltage range, the second battery directly provides power to the first battery via the direct electrical connection between the first battery and the second battery to thereby prevent the first battery from falling below the lower limit of the first voltage range when both the first battery and the second battery are disconnected from the load.

2. The apparatus of claim 1, wherein a lower limit of the second voltage range is smaller than the lower limit of the first voltage range.

3. The apparatus of claim 1, wherein a battery capacity of the second battery is smaller than a battery capacity of the first battery.

4. The apparatus of claim 1, wherein the first and second batteries are of an all-solid thin-film lithium ion type.

5. The apparatus of claim 1, wherein the upper limit of the second voltage range is higher than a voltage beyond which the first battery is damaged.

6. The apparatus of claim 1, wherein the first and second batteries have different electrochemical structures.

7. The apparatus of claim 6, wherein a material used for positive electrodes of the first and second batteries is of $LiCoO_2$ type, wherein the positive electrode of the first battery is annealed at a first temperature, and wherein the positive electrode of the second battery is annealed at a second temperature, said first temperature being greater than the second temperature.

8. The apparatus of claim 1, wherein positive electrode of the second battery is made of a material selected from the group consisting of: $LiMn_2O_4$, $MnO_2$, $Li_4Mn_5O_{12}$, $LiV_3O_8$, $V_2O_5$.

9. An electronic system, comprising:
a battery system including:
a first battery delivering battery voltage in a first voltage range; and
a second battery, directly electrically connected in parallel with the first battery, and delivering battery voltage in a second voltage range; and
a control circuit controlling a switch to disconnect both the first battery and the second battery of the battery system from a load to be powered when a voltage across the first and second batteries reaches a threshold;
wherein an upper limit of the second voltage range is between a high limit and a low limit of the first voltage range, such that if the battery voltage of the first battery falls below the upper limit of the second voltage range, the second battery directly provides power to the first battery via the direct electrical connection between the first battery and the second battery to thereby prevent the first battery from falling below the low limit of the first voltage range when the first battery and the second battery are disconnected from the load.

10. The system of claim 9, wherein the threshold is greater than the low limit of the first voltage range and smaller than the upper limit of the second voltage range.

11. The system of claim 9, further comprising a battery recharge element configured to recharge said battery system.

12. The apparatus of claim 1, wherein the direct electrical connection between the first battery and the second battery is a direct unbroken electrical connection.

13. The system of claim 9, wherein the direct electrical connection between the first battery and the second battery is a direct unbroken electrical connection.

14. The apparatus of claim 1, wherein the direct electrical connection between the first battery and the second battery is a direct unbroken electrical connection devoid of intervening components.

15. The system of claim 9, wherein the direct electrical connection between the first battery and the second battery is a direct unbroken electrical connection devoid of intervening components.

* * * * *